United States Patent
Cervenka

(10) Patent No.: US 10,042,052 B2
(45) Date of Patent: Aug. 7, 2018

(54) METHOD AND SYSTEM FOR DETERMINING A LOCATION OF A REFLECTING SCATTERER IN A MEDIUM

(71) Applicants: UNIVERSITE PIERRE ET MARIE CURIE, Paris (FR); CENTRE NATIONAL DE LA RECHERCHE SCIENTIFIQUE—CNRS, Paris (FR)

(72) Inventor: Pierre Cervenka, Gif-sur-Yvette (FR)

(73) Assignees: UNIVERSITE PIERRE ET MARIE CURIE (PARIS 6), Paris (FR); CENTRE NATIONAL DE LA RECHERCHE SCIENTIFIQUE—CNRS, Paris (FR)

( * ) Notice: Subject to any disclaimer, the term of this patent is extended or adjusted under 35 U.S.C. 154(b) by 216 days.

(21) Appl. No.: 14/909,293

(22) PCT Filed: Aug. 1, 2014

(86) PCT No.: PCT/IB2014/001603
§ 371 (c)(1),
(2) Date: Feb. 1, 2016

(87) PCT Pub. No.: WO2015/015294
PCT Pub. Date: Feb. 5, 2015

(65) Prior Publication Data
US 2016/0187480 A1 Jun. 30, 2016

(30) Foreign Application Priority Data
Aug. 1, 2013 (FR) ...................................... 13 57680

(51) Int. Cl.
*G01S 15/00* (2006.01)
*G01S 15/42* (2006.01)
*G01S 7/526* (2006.01)

(52) U.S. Cl.
CPC .............. *G01S 15/42* (2013.01); *G01S 7/526* (2013.01)

(58) Field of Classification Search
CPC .................................. G01S 15/42; G01S 7/526
See application file for complete search history.

(56) References Cited

FOREIGN PATENT DOCUMENTS

WO 2008/116058 A1 9/2008

OTHER PUBLICATIONS

Pujol , Advanced interferometric techniques for high resolution bathymetry, Journal of Marine Technology Society, vol. 46, No. 2, Mar./Apr. 2012, pp. 9-31(23)(as a reference (Year: 2012).*

(Continued)

*Primary Examiner* — Hovhannes Baghdasaryan
(74) *Attorney, Agent, or Firm* — Young & Thompson

(57) ABSTRACT

A method for determining a location of a reflecting scatterer (S) in a medium (M) including a transmitting step in which a transducer (4) emits a transmit wave (T), a receiving step in which a receive array (3) provide transducer signals in response to a reflected wave (R), a beam forming step in which beam formed signals are computed, an interferometric processing step during which a complex interferometric signal is determined as a function of products of beam formed signals and conjugate of beam formed signals and a location determining step in which interferometric beam samples are selected from the complex interferometric signal, based on their complex arguments. The selected interferometric beam samples are indicatives of the location of the reflecting scatterer (S).

15 Claims, 2 Drawing Sheets

(56) References Cited

OTHER PUBLICATIONS

Christophe Sintes et al: "Gaussian approximation of interferometric PDF for MLE derivation", OCEANS, 2012, IEEE, Oct. 14, 2012 (Oct. 14, 2012), pp. 1-5, XP032300005, ISBN: 978-1-4673-0829-8, DOI: 10.1109/OCEANS.2012.6405038.
Luren Yang et al: "Multibeam Sonar Bottom Detection Using Multiple Subarrays", OCEANS, 1997, IEEE, Oct. 6-9, 1997, pp. 932-938, ISBN: 0-7803-4108-2, DOI: 10.1109/OCEANS.1997.624116.
International Search Report, dated May 12, 2015, from corresponding PCT Application.

\* cited by examiner

METHOD AND SYSTEM FOR DETERMINING A LOCATION OF A REFLECTING SCATTERER IN A MEDIUM

FIELD OF THE INVENTION

The invention relates to the field of wave propagation in mediums and determining the location of a reflecting scatterer in a medium.

The scatterer may be a single particle or discontinuity, or may be a plurality of reflecting particles or discontinuities. The scatterer may also be an extended (1D or 2D) discontinuity or interface in the medium. The scatterer should thus be understood, in general fashion, as any element in the medium, or any portion of the medium, able to reflect a wave propagating in the medium.

More particularly, the invention is related to methods and systems for determining the location of such a scatterer. The invention is also related to methods and systems for determining a displacement or change in orientation of said scatterer.

The invention can find applications in the fields of bathymetry, obstacle avoidance sonars, non-destructive testing of materials, medical imaging such as such as medical echography, mobile probe position calibration and more generally in every field where a reflecting scatterer in a medium has to be located in an efficient and reliable way.

In a specific application of the invention the wave is an acoustic wave, but the invention may also be applied to electro-magnetic waves.

BACKGROUND OF THE INVENTION

To perform such a localisation, a large amount of echoes is usually collected and processed to determine various distances of the reflecting scatterers along associated directions of arrival of reflected waves. This processing requires robust and efficient methods. In particular, it is very often needed for the computational load to remain limited enough to enable the in-line production of soundings from the recorded signals.

These requirements are blatant in the field of bathymetry where the cost of surveys can be very high and there is a compelling need for reliable and cost effective solutions.

High resolution imaging techniques are known but are marginally qualified for these tasks because of their large computational cost and the fact that distributions of the scatterers usually do not fit the problem of resolving a finite number of closely spaced reflectors.

Others methods, based on interferometry, are for instance described in "Multibeam sonar bottom detection using multiple subarrays" by L. Yang and T. Taxt published in Proc. OCEANS '97, vol. 2, pages 932-938, 1997. These methods will be referred to as "Sub-Array Interferometric Techniques" (SAIT) in the following description.

In the SAIT methods, measurements are performed by transmitting a wave with an across-track fan geometry covering typically more than a 90°-wide sector. The reflected wave is acquired with a receiving antenna having a large array of transducers. An example of suitable acquisition system is for instance a "Multi-Beam Echo-Sounders" (MBES). To process the acquired signals, the array of transducers is divided into two sub-arrays. A pair of beams focused in the same direction can then be formed by combining the properly synchronized respective signals of these respective sub-arrays (sometimes called beamforming), thus giving two sets of focused samples $\{x_k\}$ and $\{y_k\}$ where k are the respective indexes of transducers elements in the associated sub-arrays.

An interferometric estimator Y can for instance be computed as:

$$Y = s_a s_b^* \text{ with } s_a = \frac{1}{n-p}\sum_{u=1}^{n-p} x_u \text{ and } s_b = \frac{1}{n-p}\sum_{v=p+1}^{n} x_v$$

The complex interferometric estimator $Y(t,\psi)$ can be mapped as a sectorial image made of a collection of beams where the range is associated with time and the angle is associated with the directions of the beams.

The problem is then to determine the direction of a specific scatterer with respect to the direction of the beam. Echoes from scatterers located in a resolution cell results in a complex interferometric estimator Y whose complex phase $\eta_Y = \arg Y$ can be related to the angular difference between the beam axis $\psi$ and the actual direction $\psi+\theta$ of the scatterers. With suitable parameters, in particular with a sufficient incidence of the beam on the reflecting scatterer or scatterers (for the angular footprint of the signal to be smaller than the angular resolution of the beam), the interferometric estimator Y is made of echoes whose origin sweeps the reflecting scatterer around the beam axis. Hence the complex phase of the interferometric estimator Y in function of the time of acquisition can present a ramp that is likely to cross the zero phase axis at a time corresponding to the direction of the beam axis, i.e. when $\theta=0$. The soundings are thus determined at fixed directions $\psi$ by deriving the range from a linear regression of said phase ramp $\eta_\psi(t)$ in a proper time window.

However, the SAIT methods show several drawbacks. First, it is not possible to easily determine which parts of the acquired time signals are to be processed to determine the detection of echoes from actual targets. Moreover, the relation between the complex phase of the interferometric estimator Y and the direction of arrival of the received echo $\eta(\theta)$ is multivalued, the complex phase having an ambiguity modulo $2\pi$. Also, the interferometric estimator Y is not normalized and the phase ramps have thus to be detected by using miscellaneous tricks, mostly based on the magnitude of echoes, continuity of the tracked profile within the ping and inter-pings. These tricks are frequently not fully reliable and/or are based on too restrictive assumption (e.g. no more than one single interface in each direction).

There is thus a need for a cost effective and reliable method and system for determining a location of a reflecting scatterer in a medium. Such a method and system could, among other advantages, promote safety of navigation by improving bathymetry processing.

SUMMARY OF THE INVENTION

To this aim, according to the invention, such a method for determining a location of a reflecting scatterer in a medium, comprises:
- a transmitting step in which at least one transducer emits a transmit wave in a medium, said transmit wave being reflected in part by a reflecting scatterer in the medium to form a reflected wave;
- a receiving step in which a receive array of n transducers provide respective transducer signals $s_1, \ldots, s_n$, each transducer signal $s_i$ comprising a time series of samples $s_i(t)$ acquired by a respective transducer i in response to the reflected wave, where n is an integer greater than 1 and $1 \le i \le n$;

a beamforming step in which n beamformed signals $x_1, \ldots, x_n$ are computed by focusing the n transducers signals $s_1, \ldots, s_n$ in a predetermined spatial direction $\psi$ relative to the receive array of transducers;

an interferometric processing step during which a complex interferometric signal C comprising a time series of interferometric beam samples C(t) is determined, said complex interferometric signal C being a function of at least one product $x_i x_j^*$ of a beamformed signal $x_i$ and a conjugate of a beamformed signal $x_j$, with $1 \le i,j \le n$; and a location determining step during which at least one interferometric beam sample $C(t_s)$ is selected from the complex interferometric signal C, based on a complex argument of said selected interferometric beam sample $C(t_s)$, said selected interferometric beam sample $C(t_s)$ being indicative of a location of the reflecting scatterer.

In some embodiments, one might also use one or more of the following features:

the location determining step comprises selecting interferometric beam samples $C(t_s)$ whose complex arguments belong to a predefined range of complex argument values wherein a one-to-one correspondence exists between a complex argument of interferometric signal C and a viewing angle of the reflecting scatterer relative to the predetermined spatial direction;

the location determining step further comprises determining said viewing angle from said one-to-one correspondence and said complex argument of the selected interferometric beam sample $C(t_s)$, said one-to-one correspondence being determined from a geometry of the receive array;

said predefined range of complex argument values is comprised between −1.35 and 1.35;

the location determining step comprises selecting interferometric beam samples from the complex interferometric signal C, whose modulus are higher than a predefined modulus threshold, in particular a predefined modulus threshold being function of a complex argument of the selected interferometric beam sample $C(t_s)$;

the predefined modulus threshold is a fraction of a predefined maximal modulus of the complex interferometric signal C;

the complex interferometric signal C is a function of a complex estimator Q being a function of a sum of a whole upper right triangle, excluding a main diagonal, of a matrix, said matrix being an outer product of a column vector X made of the n beamformed signals $x_1, \ldots, x_n$ and a hermitian conjugate $X^H$ of said column vector X;

the complex estimator Q is determined by dividing an interferometric signal sum $S_{n-1}$ by a normalisation coefficient $n(n-1)/2$, the interferometric signal sum $S_{n-1}$ is determined by initialising to zero a sum element $c_0$ and an interferometric signal sum $S_0$ and performing n−1 times, with index i varying between 0 and n−2, the operations of:

determining a sum element $c_{i+1}$ by summing beamformed signal $x_{i+1}$ and sum element $c_i$, determining a product element $p_{i+1}$ by computing a product of sum element $c_{i+1}$ and a conjugate $x_{i+2}^*$ of beamformed signal $x_{i+2}$, and determining an interferometric signal sum $S_{i+1}$ by summing interferometric signal sum $S_i$ and product element $p_{i+1}$;

the complex interferometric signal C is determined by dividing the complex estimator Q by a mean intensity $E^2$ received by the transducer of the array, in particular a mean intensity $E^2$ function of a trace of said matrix;

the method further comprises a soundings determination step wherein a plurality of soundings are determined on the basis of the selected at least one interferometric beam sample $C(t_s)$;

the plurality of soundings are determined by repeatedly merging at least two closest interferometric beam samples of the selected interferometric beam samples, until a minimal distance, being a distance separating two closest interferometric beam samples of the selected interferometric beam samples, is higher than a predefined minimal distance threshold;

two closest interferometric beam samples are merged by determining a barycentre of said at least two closest interferometric beam samples with respective weights being functions of respective modulus of the respective closest interferometric beam sample, and associating to said barycentre an additional weight function of the modulus of said at least two closest interferometric beam samples;

the method further comprises a receiving array optimizing step wherein n calibration factors associated to the n transducers of the array are determined, each calibration factor i being associated with a respective transducer i of the array and weighting the time series of samples $s_i(t)$ acquired by said transducer i, said n calibration factors being determined by minimizing a cost function, said cost function being a function of an average distance of the modulus of selected interferometric beam samples $C(t_s)$ with a predefined maximal modulus, in particular a predefined maximal modulus being function of a complex argument of the selected interferometric beam sample $C(t_s)$;

the series of steps (a-e) of transmitting, receiving, beamforming, interferometric processing and location determining is performed at least a first and a second time to obtain associated first interferometric beam samples $C_1(t_s)$ and second interferometric beam samples $C_2(t_s)$, and the method further comprises a displacement determining step wherein a scatterer displacement value is determined as a function of said first interferometric beam samples $C_1(t_s)$ and second interferometric beam samples $C_2(t_s)$.

The invention also has as an object a system for determining a location of a reflecting scatterer in a medium, comprising:

at least one transducer to emit an transmit wave in the medium, said transmit wave being reflected in part by a reflecting scatterer in the medium to form a reflected wave, a receive array of n transducers to provide respective transducer signals $s_1, \ldots, s_n$, each transducer signal $s_i$ comprising a time series of samples $s_i(t)$ acquired by a respective transducer i in response to the reflected wave, where n is an integer greater than 1 and $1 \le i \le n$ and a processor to compute n beamformed signals $x_1, \ldots, x_n$ by focusing the plurality of n transducers signals $s_1, \ldots, s_n$ in a predetermined spatial direction relative to the receive array of transducers;

determine a complex interferometric signal C comprising a time series of interferometric beam samples C(t), said complex interferometric signal C being a function of at least one product $x_i x_j^*$ of a beamformed signal $x_i$ and a conjugate of a beamformed signal $x_j$, with $1 \leq i,j \leq n$; and select at least one interferometric beam sample $C(t_s)$ from the complex interferometric signal C, based on a complex argument of said selected interferometric beam sample $C(t_s)$, said selected interferometric beam sample $C(t_s)$ being indicative of a location of the reflecting scatterer.

BRIEF DESCRIPTION OF THE DRAWINGS

Other characteristics and advantages of the invention will readily appear from the following description of several of its embodiments, provided as non-limitative examples, and of the accompanying drawings.

On the drawings.

On the different figures, the same reference signs designate like or similar elements.

DETAILED DESCRIPTION

Figure 1:
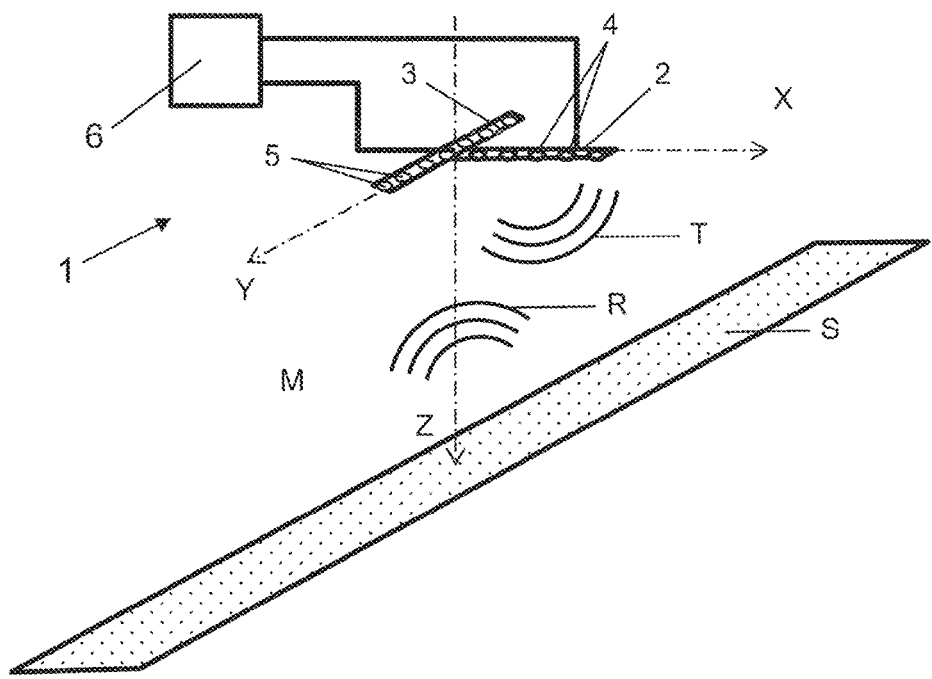
FIG. 1 illustrates a system for determining a location of a reflecting scatterer in a medium according to an embodiment of the invention.

FIG. 1 illustrates a system 1 for determining a location of a reflecting scatterer S in a medium M according to one embodiment of the invention.

System 1 comprises a transmit array 2 and a receive array 3. The transmit array 2 and the receive array 3 can for instance be part of an echo-sounder such as a "Multi-Beam Echo-Sounders" (MBES).

The transmit array 2 can comprise one transducer 4 or can comprise several transducers 4 that may then be juxtaposed, for example in a linear array extending along a longitudinal axis X.

The transducers 4 of transmit array 2 are able to emit a transmit wave T in the medium M.

Transmit wave T may have a central frequency that belongs to an acoustic propagation frequency window of the medium, for instance between 10 kHz and 800 kHz for a medium like water, for example in the range 30-34 kHz. In the case of a more solid medium such as a body or tissues, transmit wave T may have a higher central frequency, for instance of the order of several MHz, for instance 2 MHz.

The transducer 4 can emit several successive transmit waves T, usually called ping. The transmit waves T may be temporally delimited with boxcar envelopes and temporally separated one from the other by delays.

In one specific example of realisation, transmit array 2 may thus transmits a sequence of several transmit waves T in the range 30-34 kHz with boxcar envelopes of several milliseconds duration each, and several milliseconds delay between the successive transmit waves T, this example not being limitative. A radial resolution of system 1 can thus be determined and may be, in the above example, of a few meters.

Each transmit wave T may cover a disjoint angular sector of the medium. In one specific and non-limitative example of the invention, the width of each angular sector may vary between 10° and 20°.

The total aperture of the system in the medium may be over 90°, or even over 100°, for instance over 140°.

Each transmit wave T is at least partly reflected by the reflecting scatterer S of the medium thus forming a reflected wave R.

According to one embodiment of the invention, a method for determining a location of a reflecting scatterer S in a medium M can comprise a transmitting step (a) in which at least one of said transducers 4 emits said transmit wave T in the medium M, said transmit wave T being then reflected in part by a reflecting scatterer S in the medium to form a reflected wave R.

In a receiving step (b) of said method, the reflected wave R is then acquired by receive array 3.

Receive array 3 comprises n transducers 5. Said n transducers 5 may for instance be juxtaposed, for example along a transversal axis Y, to form a linear array 3. Transversal axis Y may for instance be an axis perpendicular to longitudinal axis X as illustrated on FIG. 1.

Receive array 3 may have a more complex geometry and, for instance, may form a bidimensional or tridimensional array 3. Said n transducers 5 may thus be juxtaposed along two or three perpendicular axis. Said transducers 5 may for instance be arranged in a horizontal plan X, Y. In this case the results of a method according to the invention may be used to determine projections along several vertical planes X, Z and Y, Z.

Receive array 3 can conveniently extend, in at least one direction (for example transversal axis Y), over a length L large with regard to a central wavelength of the transmit wave T in the medium M, for instance over a length at least several times higher than said central wavelength.

This way, receive array 3 can provide a high selectivity in elevation.

In the above mentioned non-limitative example where transmit waves are in the range 30-34 kHz, receive array 3 may extend over a length of over one meter, i.e. over thirty times higher the central wavelength of the transmit wave T in the medium M.

By "length" of an array it is meant a distance separating two transducers of the array, in particular two transducers located at two opposite end of said array along a direction of extension of the array. In a regularly spaced linear array, each transducer of the array being separated from its neighbours by a distance d, the length of the array is thus the product of the number of transducers n by the separating distance d.

Each transducer i of the array 3 provides a transducer signal $s_i$ that comprises a time series of samples $s_i(t)$ acquired in response to the reflected wave R.

The n transducer signals $s_1, \ldots, s_n$ are then processed to determine a location of the reflecting scatterer S in the medium M.

System 1 also comprises a processor 6 that may for instance be adapted and/or programmed to perform step of the a method according to the invention and in particular a beamforming step (c), an interferometric processing step (d) and a location determining step (e) that will now be described in more details.

Figure 2:
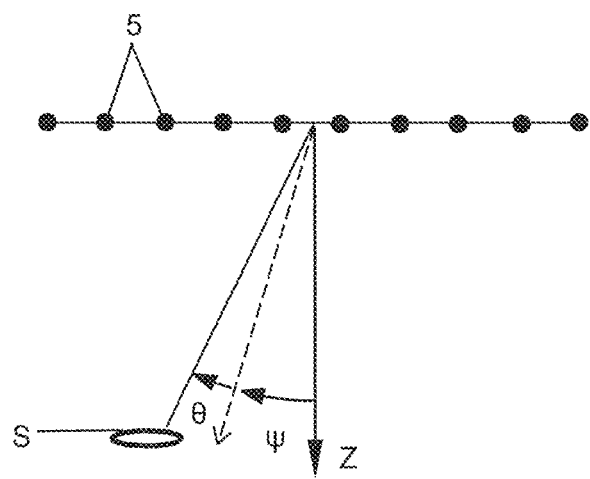
FIG. 2 illustrates a detail of the system of FIG. 1.

During the beamforming step (c), n beamformed signals $x_1, \ldots, x_n$ are computed by synchronizing the n transducers signals $s_1, \ldots, s_n$ in a predetermined spatial direction $\psi$ relative to the array of transducers as illustrated on FIG. 2.

Said beamforming step can for instance be performed by applying specific time delays to the beamformed signals $x_1, \ldots, x_n$.

The predetermined spatial direction $\psi$ relative to the array 3 of transducers 5 thus defines a beam axis direction of a beam formed by the n beamformed signals $x_1, \ldots, x_n$.

Beamforming methods are known in the field of signal processing and will not be described in greater length hereafter. Suffice to say that the particular focusing method selected for the beamforming step can be in general any of such known beamforming techniques.

A method according to the invention further comprises an interferometric processing step (d).

During said interferometric processing step a complex interferometric signal C comprising a time series of interferometric beam samples C(t) is determined.

Said complex interferometric signal C is a function of at least one product $x_i x_j^*$ of a beamformed signal $x_i$ and a conjugate of a beamformed signal $x_j$, with $1 \leq i,j \leq n$.

The complex interferometric signal C can be determined by normalizing an interferometric estimator by a total power received by the n transducers.

Thus, the modulus of the complex interferometric signal C is less than a predefined maximal modulus for each element of the time series of interferometric beam samples C(t). Said predefined maximal modulus may be equal to unity and will be described in greater details further below.

In a first embodiment, an interferometric estimator Y can be computed as:

$$Y = s_a s_b^* \text{ with } s_a = \frac{1}{n-p}\sum_{u=1}^{n-p} x_u \text{ and } s_b = \frac{1}{n-p}\sum_{v=p+1}^{n} x_v$$

In this embodiment, a complex interferometric signal can be computed as $$\rho_Y = \frac{s_a}{\sqrt{E_a^2}} \frac{s_b^*}{\sqrt{E_b^2}} = \frac{Y}{\sqrt{E_a^2 E_b^2}} \text{ with } \begin{cases} E_a^2 = \frac{1}{n-p}\sum_{u=1}^{n-p} |x_u|^2 \\ E_b^2 = \frac{1}{n-p}\sum_{v=p+1}^{n} |x_v|^2 \end{cases},$$

Several alternative normalized estimators can be defined and a variant can for instance be computed as $$\mu_Y = \frac{2(n-p)Y}{\sum_{u=1}^{n-p}(|x_u|^2 + |x_{u+p}|^2)}$$

Both alternatives verify arg $Y$=arg $\rho_Y$=arg $\mu_Y$, and $|\rho_Y|$, $|\mu_Y| \leq 1$, unit being reached when all the samples $x_1, \ldots, x_n$ are equals. Unit is reached with a single target at the focusing point, when all the transducers have the same sensitivity.

In a second embodiment, an interferometric estimator Q can be computed as:

$$Q = \frac{2}{n(n-1)}\sum_{i=1}^{n-1}\left(x_i \sum_{j=i+1}^{n} x_j^*\right)$$

In this embodiment, a complex interferometric signal can then be computed as $$C = \frac{Q}{E^2} \text{ with } E^2 = n^{-1}\sum_{k=1}^{n} x_k x_k^*$$

Thus, if one define a matrix R as an outer product of a column vector X made of the n beamformed signals $x_1, \ldots, x_n$ and a hermitian conjugate $X^H$ of said column vector X, the interferometric estimator Q can be determined by summing the $N_0 = n(n-1)/2$ elements of the whole upper right triangle of said matrix, excluding the main diagonal, and normalizing said sum by the number $N_0$ of summed elements.

In a variant, the interferometric estimator Q can be determined by summing the elements of the whole lower left triangle of said matrix, excluding the main diagonal, and normalizing said sum by the same number $N_0 = n(n-1)/2$ of summed elements.

The complex interferometric signal C can then be obtained by normalizing said interferometric estimator Q by the mean power $E^2$ received by the array of n transducers. Said mean power $E^2$ is actually the trace of said matrix R, that may be normalized by the number n of transducers.

The complex interferometric signal C is thus a function of a sum of the whole upper right triangle, excluding a main diagonal, of said matrix R.

In a variant of the second embodiment of the invention, the complex estimator Q can be determined by computing an interferometric signal sum $S_{n-1}$ and dividing said sum $S_{n-1}$ by a normalisation coefficient $n(n-1)/2$.

The interferometric signal sum $S_{n-1}$ can be determined recursively by performing the following operations.

First, a sum element $c_0$ and an interferometric signal sum $S_0$ are initialised to zero.

Then a series of operation are performed n−1 times, with index i varying between 0 and n−2 to determine interferometric signal sum $S_{n-1}$:
- a sum element $c_{i+1}$ is determined by summing beamformed signal $x_{i+1}$ and sum element $c_i$,
- a product element $p_{i+1}$ is determined by computing a product of sum element $c_{i+1}$ and a conjugate $x_{i+2}^*$ of beamformed signal $x_{i+2}$, and
- an interferometric signal sum $S_{i+1}$ is determined by summing interferometric signal sum $S_i$ and product element $p_{i+1}$.

Beamformed signals $x_1, \ldots, x_n$ may also be weighted by associated weighting factors for the computation of above interferometric signal sum, for instance by computing an interferometric estimator Q as $$Q = \frac{2}{n(n-1)}\sum_{i=1}^{n-1}\sum_{j=i+1}^{n} \alpha_{ij} x_i x_j^*$$

where $\alpha_{i,j}$ are weighting factors associated to products $x_i x_j^*$ of a beamformed signal $x_i$ and a conjugate of a beamformed signal $x_j$, with $1 \leq i$, $j \leq n$.

This allows to shades some contributions for e.g., by using a Toeplitz shading with $\alpha_{i,j} = \alpha_{j-1}$.

The beamformed signals $x_1, \ldots, x_n$ and the products $x_i x_j^*$ involved in the above mentioned estimators may also be time averaged, in particular time averaged in a window centered on the focus point of the beamformed beam.

When the complex interferometric signal C has been determined, a location determining step (e) can be performed.

During this step, at least one interferometric beam sample $C(t_s)$ is selected from the complex interferometric signal C. Advantageously, several interferometric beam samples $C(t_s)$ are selected.

The interferometric beam samples $C(t_s)$ are indicative of a location of the reflecting scatterer or scatterers S. For instance, the interferometric beam samples $C(t_s)$ may correspond to coherent echoes coming from said scatterer.

In one embodiment, the interferometric beam samples $C(t_s)$ are selected based on a complex argument of said selected interferometric beam sample $C(t_s)$.

Such a selection may be performed as follows.

A one-to-one correspondence $\xi(\eta)$ may exist between a complex argument $\eta$ of interferometric signal C and a viewing angle $\xi$ of the reflecting scatterer S relative to the predetermined spatial direction $\psi$.

Figures 3A, 3B:
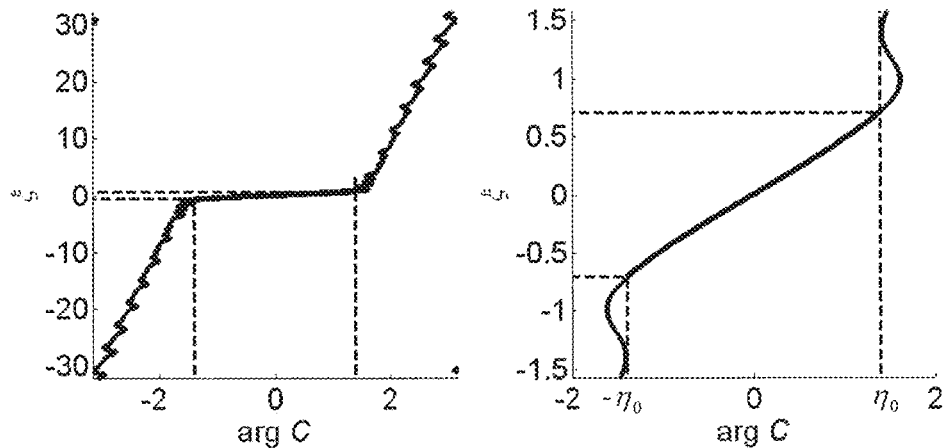
FIG. 3A is an example of a diagram showing the dimensionless viewing angle $\xi$ as a function of the complex argument of interferometric signal C according to an embodiment of the invention.
FIG. 3B is a detail of the diagram of FIG. 3A showing the one-to-one correspondence between the dimensionless viewing angle $\xi$ and the complex argument $\eta$ of interferometric signal C on a predefined range $|\eta| < \eta_0$ according to an embodiment of the invention.

This one-to-one correspondence $\xi(\eta)$ may in particular exists only for a predefined range $|\eta|<\eta_0$ of complex argument values $\eta$ of interferometric signal C where $\eta_0$ is a predefined upper threshold of the complex argument of the interferometric signal C as illustrated on FIGS. 3A and 3B.

Interferometric beam samples $C(t_s)$ may thus be selected by selecting interferometric beam samples $C(t_s)$ whose complex arguments $\eta$ belong to the predefined range $|\eta|<\eta_0$.

In one embodiment, said one-to-one correspondence $\xi(\eta)$ and said predefined upper threshold $\eta_0$ may be determined from the geometry of the receive array 3. More precisely, the one-to-one correspondence may depend on the location $X_k$ of the transducers 5 along receive array 3.

The one-to-one correspondence between the complex argument of interferometric signal C and the viewing angle may thus be determined by computing a complex interferometric signal C as described above, starting from theoretical beamformed signals $x_1, \ldots, x_n$ corresponding to a farfield point source at a predefined viewing angle $\xi$.

For example, theoretical beamformed signals $x_1, \ldots, x_n$ corresponding to a farfield point source at a predefined viewing angle $\xi$ may be computed on the basis of the location $X_k$ of the transducers 5 as $$x_k = \exp(-j2\pi X_k L^{-1} \xi)$$

where $X_k$ is the locations of transducer k in SI Units, L is the length of receive array 3 in SI Units and $\xi$ is the viewing angle of the reflecting scatterer relative to the predetermined spatial direction in dimensionless unit.

Dimensionless viewing angle $\xi$ can be related to SI Units viewing angle $\theta$ as illustrated on FIG. 2, by the expression $$\xi = l \cos \psi \sin \theta (1 - \tan \psi \tan(\theta/2))$$

where l is the length of receive array 3 in units of the central wavelength of the waves T, R in the medium M and $\psi$ is the predetermined spatial direction relative to said array 3 of transducers 5 that has been mentioned before in relation with the beamforming step of the method.

Once the complex interferometric signal C has been computed from the theoretical beamformed signals, the predefined upper threshold $\eta_0$ may be determined by plotting the complex argument of interferometric signal C as a function of viewing angle $\xi$ as illustrated on FIG. 3B.

The predefined upper threshold $\eta_0$ can for instance be determined as $\eta_0 \approx -1.35$ for a regularly spaced transducer array 3. Thus, a predefined range of complex argument values for the selected interferometric beam samples $C(t_s)$ may be comprised between $-1.35$ and $1.35$. The predefined upper threshold $\eta_0$ may be a function of the number n of transducers.

FIGS. 3A and 3B illustrates an example of such a one-to-one correspondence computed for a regularly spaced transducers array.

It should be noted that interferometric beam samples $C(t_s)$ may be selected by selecting interferometric beam samples $C(t_s)$ whose complex arguments $\eta$ belong to a smaller range than the above described predefined range $|\eta|<\eta_0$.

In particular, interferometric beam samples $C(t_s)$ may be selected by selecting interferometric beam samples $C(t_s)$ whose complex arguments $\eta$ belong to a range predefined to avoid redundancy between neighbouring beams, for instance a range $|\eta|<\eta_0/2$. This way, multiple data originating from the same scatterer are only selected once.

Figures 4A, 4B:
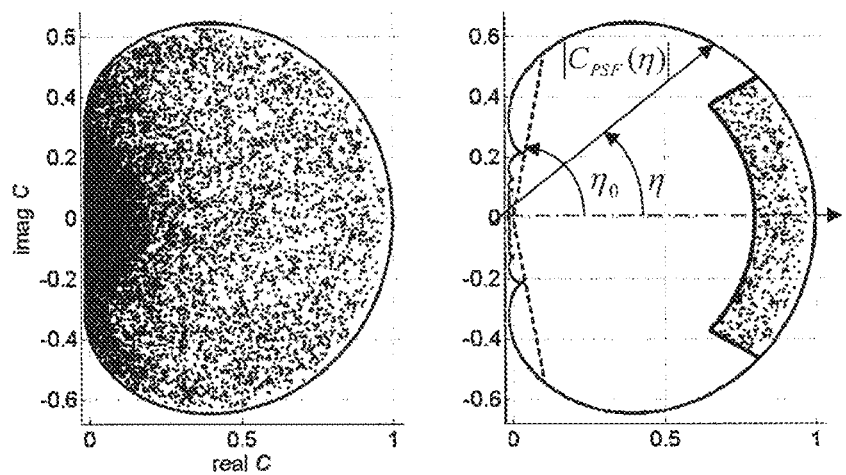
FIG. 4A is an example of a diagram showing a time series of interferometric beam samples C(t) in the complex plane obtained following the interferometric processing step of a method according to an embodiment of the invention.
FIG. 4B is an example of a diagram showing interferometric beam samples $C(t_s)$ in the complex plane obtained following the location determining step of a method according to an embodiment of the invention.

This embodiment of the invention is illustrated on FIG. 4B on which complex arguments $\eta$ of selected interferometric beam samples $C(t_s)$ belong to a reduced range of about $|\eta|<\eta_0/2$.

Once the interferometric beam samples $C(t_s)$ have been selected, the location of scatterer S may be determined in terms of viewing angle and distance in a very simple way by performing a polar migration.

The viewing angle $\theta$ of the scatterer with reference to the predetermined spatial direction $\psi$ of the beam can be determined from the complex argument of the interferometric beam samples $C(t_s)$ as detailed above and illustrated on FIG. 2.

The distance r of the scatterer along the direction given by viewing angle $\theta$ can be computed from the time of arrival of the reflected wave $t_s$, taking into account the speed of the wave in the medium.

The interferometric beam samples $C(t_s)$ are thus indicative of a location of the reflecting scatterer.

The location determining step (e) may also comprise an operation of selecting interferometric beam samples from the complex interferometric signal C, whose modulus are higher than a predefined modulus threshold as illustrated on FIG. 4B.

This operation may increase the signal over noise ratio by selecting only interferometric beam samples which correspond to coherent reflection of the transmit wave T onto the reflecting scatterer S.

By "coherent reflection" it is meant a reflected wave R that lead to coherent interferences when acquired by the receive array 3 of transducers 5.

In particular, a predefined maximal modulus $|C_{PSF}(\eta)|$ of the complex interferometric signal C may be theoretically or experimentally predetermined as a modulus of the complex interferometric signal C in response to a single off-axis scatterer.

The predefined maximal modulus $|C_{PSF}(\eta)|$ may depend on the complex argument $\eta$ of the complex interferometric signal C.

In particular, a normalized coherence factor R may be computed by normalizing complex interferometric signal C by said predefined maximal modulus as $$R = \frac{C}{|C_{PSF}(\eta)|}$$

Normalized coherence factor R may for instance be defined in said predefined range of complex argument $|\eta = \arg C| < \eta_0$.

Normalized coherence factor R may have a modulus comprised between zero and one.

A predefined modulus threshold f may then be defined as a fraction of said predefined maximal modulus $|C_{PSF}(\eta)|$ above which the complex interferometric signal C is considered to be sufficiently coherent to results from a coherent reflection of a wave onto a reflecting scatterer.

A predefined modulus threshold may for instance be equal to 0.1 times said predefined maximal modulus, or 0.3 times said predefined maximal modulus.

In an embodiment of the invention in which the acquired beamformed signals present a high signal-over-noise ratio, the predefined modulus threshold may be higher for instance equal to 0.8 or 0.9 times said predefined maximal modulus.

In one embodiment, the method according to the invention may further comprise a soundings determination step (f) during which a plurality of soundings are determined on the basis of the selected interferometric beam samples C(ts).

By "a sounding" it is in particular meant a measured depth of water over a specific point of a seabed as known in the field of bathymetry.

The selected interferometric beam samples $C(t_s)$ may correspond to several scatterers and the soundings determination step aims in particular at merging together all the interferometric beam samples $C(t_s)$ that correspond to a same scatterer, in particular the interferometric beam samples $C(t_s)$ in polar coordinates as detailed above.

The plurality of soundings may for instance be determined by repeatedly merging at least two closest interferometric beam samples of the selected interferometric beam samples, until a minimal distance, being a distance separating two closest interferometric beam samples of the selected interferometric beam samples, is higher than a predefined minimal distance threshold.

To this aim, the selected interferometric beam samples are first converted, or migrated, in polar units, as detailed above, by computing polar coordinates comprising a distance $r_k$ and an angle $\psi_k$ of each scatterer associated to a selected interferometric beam sample k. Said polar coordinates may for instance be defined in relation to the location and orientation of the receive array 3 of transducers 5.

The polar coordinates are then rescaled with predefined radial and angular resolutions $\delta r, \delta \psi$ (L2-norm).

At least two closest interferometric beam samples of the selected interferometric beam samples are then replaced by their barycenter.

By "closest interferometric beam samples" it is understood the closest interferometric beam samples according to a distance provided by the L2-norm on the rescaled polar coordinates of the interferometric beam samples $C(t_s)$.

The barycenter is an interferometric beam sample defined by weighting each of said closest interferometric beam samples with a barycentric weight function of the modulus of the complex interferometric signal C or of the modulus of the normalized coherence factor R. The barycentric weight barycenter is a function of a sum of the barycentric weights of each of said closest interferometric beam samples.

Said barycentric weights may be linear functions of said modulus or may be non-linear functions, for instance a function equivalent to a signal-to-noise ratio $$w_k = R_k/(1-R_k)$$

An additional weight may be associated to the obtained barycenter. The additional weight of the barycenter may be a function of the modulus of the complex interferometric signal C or of the modulus of the normalized coherence factor R of said closest interferometric beam samples. This additional weight may be computed as a function of the normalized coherence factor R of the merged closest interferometric beam samples, for instance a sum, a maximum. It may also be a more general function of said closest interferometric beam samples, and in a general fashion, any commutative function, i.e. any function independent of the order of its arguments may be employed. Advantageously, such a commutative function may gives results comprised between a sum of the arguments and a maximum of the arguments.

The operations of replacing several closest interferometric beam samples by their barycenter is then reiterated until the distance separating two closest interferometric beam samples is higher than a predefined minimal distance threshold.

Said predefined minimal distance threshold can typically be less than a few units of said L2-norm distance.

A set of sounding can then be determined from the resulting set of interferometric beam samples by converting the polar coordinates of each interferometric beam samples in an associated depth of water.

Barycentric or additional weights associated to the interferometric beam samples may be used in following processes, in particular as weighting factors, for instance to construct a numerical model of a seabed taking into account sounding with associated quality factors. Such a numerical model may for instance be constructed by performing a method such as the "Combined Uncertainty and Bathymetry Estimator" (CUBE) detailed for example in "Automatic Statistical Processing of Multibeam Echosounder Data" published by Calder B. R. in International Hydrographic Review, Vol. 4, No 1, pp 16, 2003. The above mentioned factors $\rho_Y$ and $\mu_Y$ may also be used to determine such weighting factors.

In one embodiment, the method according to the invention may further comprise a receiving array optimizing step (g) wherein n calibration factors associated to the receive array 3 of n transducers 5 are determined.

Advantageously, the calibration factors are complex numbers. Each calibration factors thus have a complex argument, or phase, and a modulus that can be adjusted during the minimization.

Each calibration factor i is associated with a respective transducer i of the receive array 3 and weights the time series of samples $S_i(t)$ acquired by said transducer i.

In particular, the n calibration factors may be determined by minimizing a cost function.

In one embodiment of the invention, the cost function may function of an average distance of the modulus of selected interferometric beam samples $C(t_s)$ with a predefined maximal modulus.

The predefined maximal modulus may in particular be function of the complex argument of the selected interferometric beam sample $C(t_s)$.

One example of said predefined maximal modulus is the above mentioned predefined maximal modulus $|C_{PSF}(\eta)|$ which can be theoretically or experimentally predetermined as a modulus of the complex interferometric signal C in response to a single off-axis scatterer.

The cost function is minimized using known minimization algorithms. The n calibration factors may be initialized to unity before performing the minimization of the cost function.

Constrains must be applied on the set of n calibration factors. For instance, the mean modulus of the n calibration factors may be kept constant during the minimization. Also, the mean complex argument, or phase, of the n calibration factors may be kept constant during the minimization and, for instance equal to zero. The mean slope of calibration factor phase versus transducer index may be kept constant and, for instance, equal to zero.

In one embodiment, the method according to the invention may further comprise a displacement determining step (h).

In this embodiment in particular, several successive acquisition may be performed by the system 1. In particular, the series of steps (a-e) of transmitting, receiving, beamforming, interferometric processing and location determining may be performed sequentially several times to obtain several sets of selected interferometric beam samples $C_i(t_s)$ associated to the emission of several successive transmit waves T and the processing of transducer signals corresponding to the associated several successive reflected waves R.

For instance the series of steps (a-e) may be performed at least a first and a second successive time to obtain first interferometric beam samples $C_1(t_s)$ and second interferometric beam samples $C_2(t_s)$.

A displacement determining step (h) is then performed following said iterations of steps (a-e).

During the displacement determining step (h) a scatterer displacement value is determined as a function of the sets of selected interferometric beam samples $C_i(t_s)$ corresponding to successive transmit waves $T_i$.

By "scatterer displacement value", it should be understood a value indicative of a displacement, rotation and/or deformation of scatterer S between said successive transmit waves $T_i$, said displacement, rotation and/or deformation being in particular considered in a coordinate system associated to the receiving array 3.

The displacement determining step can comprise an operation of computing a product $\Pi_{i,j}$ of successive interferometric beam samples $C_i$ expressed for example as $$\Pi_{t,\Delta t}(r,\psi)=C_t(r,\psi)\cdot C^*_{t+\Delta t}(r,\psi)$$

In a variant, a normalized product $\Pi_{i,j}$ may be computed on the basis on the normalized coherence factors R as detailed above, for instance by computing product $R_i \cdot R_{i+1}^*$.

The obtained set of products $\Pi_{i,j}$ may be filtered by selecting product $\Pi_{i,j}$ whose modulus are higher than a predefined product modulus threshold, in a similar manner to the above mentioned selection of interferometric beam samples from the complex interferometric signal C based on their modulus.

A scatterer displacement value or a set of scatterer displacement values may then be computed as a function of a complex argument, a phase and/or a modulus of computed products $\Pi_{i,j}$.

For instance the complex argument of product $\Pi_{i,j}$ can be used to give a scatterer displacement value indicative of the rotation between the first and second acquisitions. In particular by using the above described one-to-one correspondence $\xi(\eta)$, this time between the complex argument of product $\Pi_{i,j}$ and the rotation angle between the first and second acquisitions.

The invention claimed is:

1. A method for determining a location of a reflecting scatterer in a medium, the method comprising:
   a transmitting step in which at least one transducer emits a transmit wave in a medium, said transmit wave being reflected in part by a reflecting scatterer in the medium to form a reflected wave;
   a receiving step in which a receive array of n transducers provide respective transducer signals $s_1, \ldots, s_n$, each transducer signal $s_i$ comprising a time series of samples $s_i(t)$ acquired by a respective transducer i in response to the reflected wave, where n is an integer greater than 1 and $1 \leq i \leq n$;
   a beamforming step in which n beamformed signals $x_1, \ldots, x_n$ are computed by focusing the n transducers signals $s_1, \ldots, s_n$ in a predetermined spatial direction $\psi$ relative to the receive array of transducers;
   an interferometric processing step during which a complex interferometric signal C comprising a time series of interferometric beam samples C(t) is determined, said complex interferometric signal C being a function of at least one product $x_i x_j^*$ of a beamformed signal $x_i$ and a conjugate of a beamformed signal $x_j$, with $1 \leq i,j \leq n$; and
   a location determining step during which at least one interferometric beam sample $C(t_s)$ is selected from the complex interferometric signal C, based on a complex argument of said selected interferometric beam sample $C(t_s)$, said selected interferometric beam sample $C(t_s)$ being indicative of a location of the reflecting scatterer.

2. The method of claim 1, wherein the location determining step comprises selecting interferometric beam samples $C(t_s)$ whose complex arguments belong to a predefined range of complex argument values wherein a one-to-one correspondence exists between a complex argument of interferometric signal C and a viewing angle of the reflecting scatterer relative to the predetermined spatial direction.

3. The method of claim 2, wherein the location determining step further comprises determining said viewing angle from said one-to-one correspondence and said complex argument of the selected interferometric beam sample $C(t_s)$, said one-to-one correspondence being determined from a geometry of the receive array.

4. The method of claim 2, wherein said predefined range of complex argument values is comprised between −1.35 and 1.35.

5. The method of claim 1, wherein the location determining step comprises selecting interferometric beam samples from the complex interferometric signal C, whose modulus are higher than a predefined modulus threshold, in particular a predefined modulus threshold being function of a complex argument of the selected interferometric beam sample $C(t_s)$.

6. The method of claim 5, wherein the predefined modulus threshold is a fraction of a predefined maximal modulus of the complex interferometric signal C.

7. The method of claim 1, wherein the complex interferometric signal C is a function of a complex estimator Q being a function of a sum of a whole upper right triangle, excluding a main diagonal, of a matrix, said matrix being an outer product of a column vector X made of the n beamformed signals $x_1, \ldots, x_n$ and a hermitian conjugate $X^H$ of said column vector X.

8. The method of claim 7, wherein the complex estimator Q is determined by dividing an interferometric signal sum $S_{n-1}$ by a normalisation coefficient $n(n-1)/2$, wherein the interferometric signal sum $S_{n-1}$ is determined by initialising to zero a sum element $c_0$ and an interferometric signal sum $S_0$ and performing n−1 times, with index i varying between 0 and n−2, the operations of:

determining a sum element $c_{i+1}$ by summing beamformed signal $x_{i+1}$ and sum element $c_i$, determining a product element $p_{i+1}$ by computing a product of sum element $c_{i+1}$ and a conjugate $x_{i+2}^*$ of beamformed signal $x_{i+2}$, and determining an interferometric signal sum $S_{i+1}$ by summing interferometric signal sum $S_i$ and product element $p_{i+1}$.

9. The method of claim 7, wherein the complex interferometric signal C is determined by dividing the complex estimator Q by a mean intensity $E^2$ received by the transducer of the array, in particular a mean intensity $E^2$ function of a trace of said matrix.

10. The method of claim 1, further comprising a soundings determination step wherein a plurality of soundings are determined on the basis of the selected at least one interferometric beam sample $C(t_s)$.

11. The method of claim 10, wherein the plurality of soundings are determined by repeatedly merging at least two closest interferometric beam samples of the selected interferometric beam samples, until a minimal distance, being a distance separating two closest interferometric beam samples of the selected interferometric beam samples, is higher than a predefined minimal distance threshold.

12. The method of claim 11, wherein two closest interferometric beam samples are merged by determining a barycentre of said at least two closest interferometric beam samples with respective weights being functions of respective modulus of the respective closest interferometric beam sample, and associating to said barycentre an additional weight function of the modulus of said at least two closest interferometric beam samples.

13. The method of claim 1, further comprising a receiving array optimizing step wherein n calibration factors associated to the n transducers of the array are determined, each calibration factor i being associated with a respective transducer i of the array and weighting the time series of samples $s_i(t)$ acquired by said transducer i, said n calibration factors being determined by minimizing a cost function, said cost function being a function of an average distance of the modulus of selected interferometric beam samples $C(t_s)$ with a predefined maximal modulus, in particular a predefined maximal modulus being function of a complex argument of the selected interferometric beam sample $C(t_s)$.

14. The method of claim 1, wherein the series of steps of transmitting, receiving, beamforming, interferometric processing and location determining is performed at least a first and a second time to obtain associated first interferometric beam samples $C_1(t_s)$ and second interferometric beam samples $C_2(t_s)$, the method further comprising a displacement determining step wherein a scatterer displacement value is determined as a function of said first interferometric beam samples $C_1(t_s)$ and second interferometric beam samples $C_2(t_s)$.

15. A system for determining a location of a reflecting scatterer in a medium, comprising:

at least one transducer to emit an transmit wave in the medium, said transmit wave being reflected in part by a reflecting scatterer in the medium to form a reflected wave, a receive array of n transducers to provide respective transducer signals $s_1, \ldots, s_n$, each transducer signal $s_i$ comprising a time series of samples $s_i(t)$ acquired by a respective transducer i in response to the reflected wave, where n is an integer greater than 1 and $1 \le i \le n$ and a processor to compute n beamformed signals $x_1, \ldots, x_n$ by focusing the plurality of n transducers signals $s_1, \ldots, s_n$ in a predetermined spatial direction relative to the receive array of transducers;

determine a complex interferometric signal C comprising a time series of interferometric beam samples C(t), said complex interferometric signal C being a function of at least one product $x_i x_j^*$ of a beamformed signal $x_i$ and a conjugate of a beamformed signal $x_j$, with $1 \le i,j \le n$; and select at least one interferometric beam sample $C(t_s)$ from the complex interferometric signal C, based on a complex argument of said selected interferometric beam sample $C(t_s)$, said selected interferometric beam sample $C(t_s)$ being indicative of a location of the reflecting scatterer.

\* \* \* \* \*